United States Patent
Okimoto (12)

(10) Patent No.: US 6,681,162 B2
(45) Date of Patent: Jan. 20, 2004

(54) CORRECTIVE DEVICE FOR OUTPUT OF ACCELERATION SENSOR AND METHOD OF CORRECTING OUTPUT THEREOF

(75) Inventor: Yukihiro Okimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/372,387

(22) Filed: Feb. 25, 2003

(65) Prior Publication Data

US 2003/0171862 A1 Sep. 11, 2003

(30) Foreign Application Priority Data

Mar. 11, 2002 (JP) .......................................... 2002-065722

(51) Int. Cl.⁷ .............................. G06F 19/00; G06F 7/00
(52) U.S. Cl. .............................. 701/34; 701/31; 701/45; 180/282
(58) Field of Search .............................. 701/45, 36, 34, 701/35, 301, 29, 31; 280/735; 73/1.37; 180/282

(56) References Cited

U.S. PATENT DOCUMENTS

| 5,081,442 | A | * | 1/1992 | Ito et al. ...................... 340/438 |
| 5,673,932 | A | * | 10/1997 | Nitschke et al. ............. 280/735 |
| 5,897,599 | A | * | 4/1999 | Takeuchi ...................... 701/46 |
| 6,308,554 | B1 | * | 10/2001 | Mattes et al. ................. 73/1.37 |
| 6,360,147 | B1 | * | 3/2002 | Lee .............................. 701/35 |
| 6,470,249 | B1 | * | 10/2002 | Schmid et al. ................ 701/45 |

FOREIGN PATENT DOCUMENTS

| JP | 5-23139 | 3/1993 |
| JP | 07-159438 | 6/1995 |
| JP | 2812007 | 8/1998 |

* cited by examiner

Primary Examiner—Thomas G. Black
Assistant Examiner—Ronnie Mancho
(74) Attorney, Agent, or Firm—Sughrue Mion, PLLC

(57) ABSTRACT

In a corrective device for an output of an acceleration sensor control means includes operation processing means for inputting a self-diagnosis check signal to the acceleration sensor 1, and for executing an offset corrective operation processing of the output of the acceleration sensor prior to inputting the self-diagnosis check signal to the acceleration sensor.

8 Claims, 7 Drawing Sheets

CORRECTIVE DEVICE FOR OUTPUT OF ACCELERATION SENSOR AND METHOD OF CORRECTING OUTPUT THEREOF

BACKGROUND OF THE INVENTION

1. Field of the Invention

The present invention relates to a corrective device for an output of an acceleration sensor that corrects an offset of the output of the acceleration sensor to a zero point and a method of correcting the output thereof.

2. Description of the Related Art

FIG. 9 is a block diagram showing a circuit configuration of the conventional corrective device for an output of the acceleration sensor disclosed in Published Unexamined Japanese Patent Application No. 5-45373.

Referring to FIG. 9, reference numeral 21 denotes a bridge of the acceleration sensor, 22 denotes an operational amplifier, 23 denotes an operational amplifier, 24 denotes a capacitor, 25 denotes a feedback resistor, each of them is a constituent of a low-pass filter. This circuit is arranged such that a time constant (T=CR) of the low-pass filter is determined by the capacitor 24 and the feedback resistor 25, and that a signal having a frequency higher than that determined on the basis of the time constant is to be attenuated. The operational amplifier 23 outputs a signal whose component is close to a direct-current component, i.e. an offset component. The output of the operational amplifier 23 is inputted to a non-inverted input terminal 26 of the operational amplifier 22, and a difference between the signal inputted to the non-inverted input terminal 26 and a signal inputted to an inverted input terminal 27 from the acceleration sensor, i.e. a corrected signal whose offset component has been removed appears at an output terminal 28 of the low-pass filter.

However, the conventional corrective device for an output of the acceleration sensor is configured by the hardware made up of circuitries, such as the operational amplifiers 22,23, the capacitor 24, and the feedback resistor 25. Therefore, the device suffers from a great change in the time constant due to dispersion of parts and is subject to restriction on the corrective ability attributable to limitations put on the parts (resistance value, capacitance value). Moreover, the hardware filter of this kind is likely to be affected by temperature and noises, and thus it is apt to lower the corrective ability due to deterioration of the parts.

SUMMARY OF THE INVENTION

The present invention has been made to solve the above problems and an object thereof is to provide a corrective device for an output of an acceleration sensor realizing an offset correction with accuracy by operation means on the software basis.

A corrective device for an output of an acceleration sensor according to the present invention includes operation processing means in control means for inputting a self-diagnosis check signal to an acceleration sensor, and executing an offset corrective operation processing of the output of the acceleration sensor prior to inputting the self-diagnosis check signal to the acceleration sensor.

According to the present invention, since the operation processing means inputs the self-diagnosis check signal to the acceleration sensor and executes an offset corrective operation processing of the output of the acceleration sensor prior to inputting the self-diagnosis check signal to the acceleration sensor, output variations due to the self-diagnosis check of the acceleration sensor are prevented from being taken in to the operation processing means. This enhances accuracy of a corrective operation processing and shortens a response time of the correction.

A method of correcting an output of an acceleration sensor according to the present invention, includes the steps of inputting a self-diagnosis check signal to the acceleration sensor by operation processing means in control means, and executing an offset corrective operation processing of an output of the acceleration sensor prior to inputting the self-diagnosis check signal to the acceleration sensor.

According to the present invention, since the method of correcting the output of the acceleration sensor includes the steps of inputting a self-diagnosis check signal to the acceleration sensor by the operation processing means in the control means, and executing an offset corrective operation processing of the output of the acceleration sensor prior to inputting the self-diagnosis check signal to the acceleration sensor, no influence is excised by the output variations due to the self-diagnosis check of the acceleration sensor. This enhances accuracy of the corrective operation and shortens a response time of the correction.

The above and other objects and the attendant advantages of the invention will become readily apparent by referring to the following detailed description when considered in conjunction with the accompanying drawings, wherein:

BRIEF DESCRIPTION OF THE DRAWINGS

Throughout the figures, the same reference numerals, and characters, unless otherwise noted, are used to denote like features, elements, components, or portions of the illustrated embodiment.

DETAILED DESCRIPTION OF THE PREFERRED EMBODIMENTS

The preferred embodiments of the present invention will be described in details hereinbelow with reference to the attached drawings.

Figure 1:
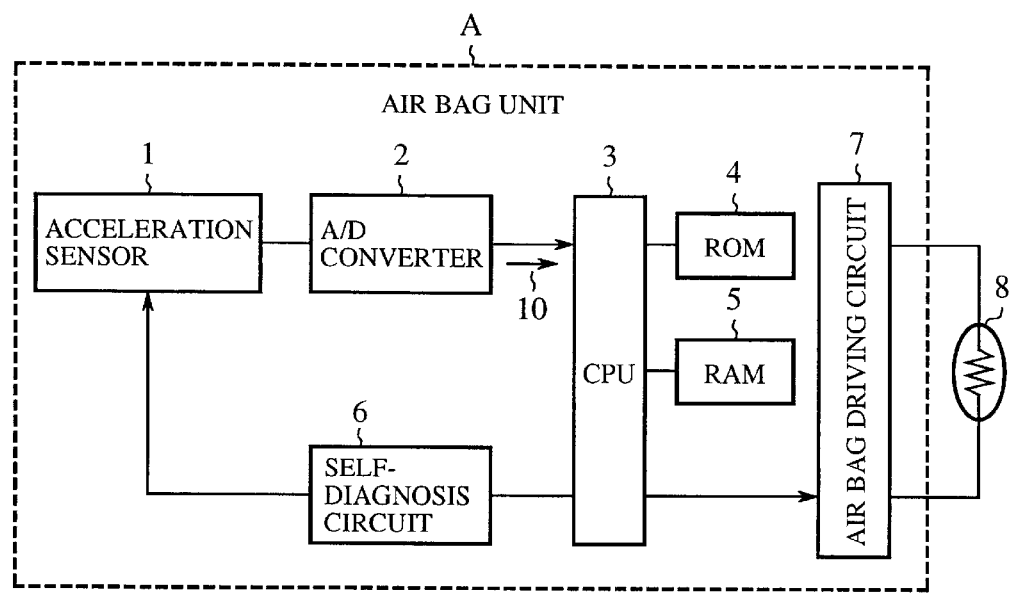
FIG. 1 is a block diagram showing an air bag unit including a corrective device for an output of the acceleration sensor of the present invention.

FIG. 1 is a block diagram showing a circuit configuration of an air bag unit (passenger protecting unit) including a corrective device for an output of the acceleration sensor according to the present invention.

Referring to FIG. 1, reference numeral 1 denotes an acceleration sensor that detects an acceleration at the time of collision, 2 denotes an A/D converter that converts an input signal of the acceleration sensor 1 into a digital signal, 3 denotes a CPU (control means, operation processing means) that takes in an output of the A/D converter 3, 4 denotes a ROM that stores therein programs run on the CPU 3, 5 denotes a RAM, temporary storing means, used by the CPU 3, 6 denotes a self-diagnosis circuit that causes the acceleration sensor 1 to be operated in a simulative fashion and diagnoses circuitry in response to a signal from the CPU 3, 7 denotes an air bag driving circuit that supplies a current to a squib 8, heat-generation resistor for air bag deployment, in response to a signal from the CPU 3.

Figure 2:
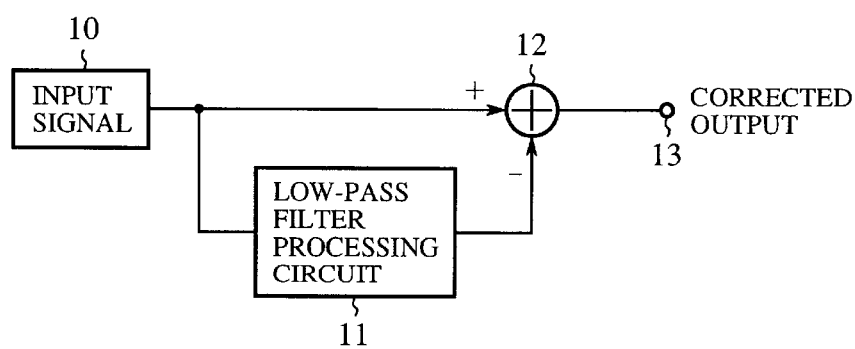
FIG. 2 is an explanatory drawing of a corrective processing operation for an output of the acceleration sensor.

FIG. 2 is an explanation drawing of the corrective processing operation of an output of the acceleration sensor executed in the CPU 3.

In FIG. 2, a low-pass filtering is executed under the control of the CPU 3 in response to an input signal 10 (an output of the acceleration sensor 1, i.e. an output signal of the A/D converter 2). The corrective operation processing is executed by the operating unit (operation processing means) 12, offset corrective operation processing circuit, that subtracts an output of the low-pass filter processing circuit 11 from an input signal 10 in order to produce the corrected output.

Figure 3:
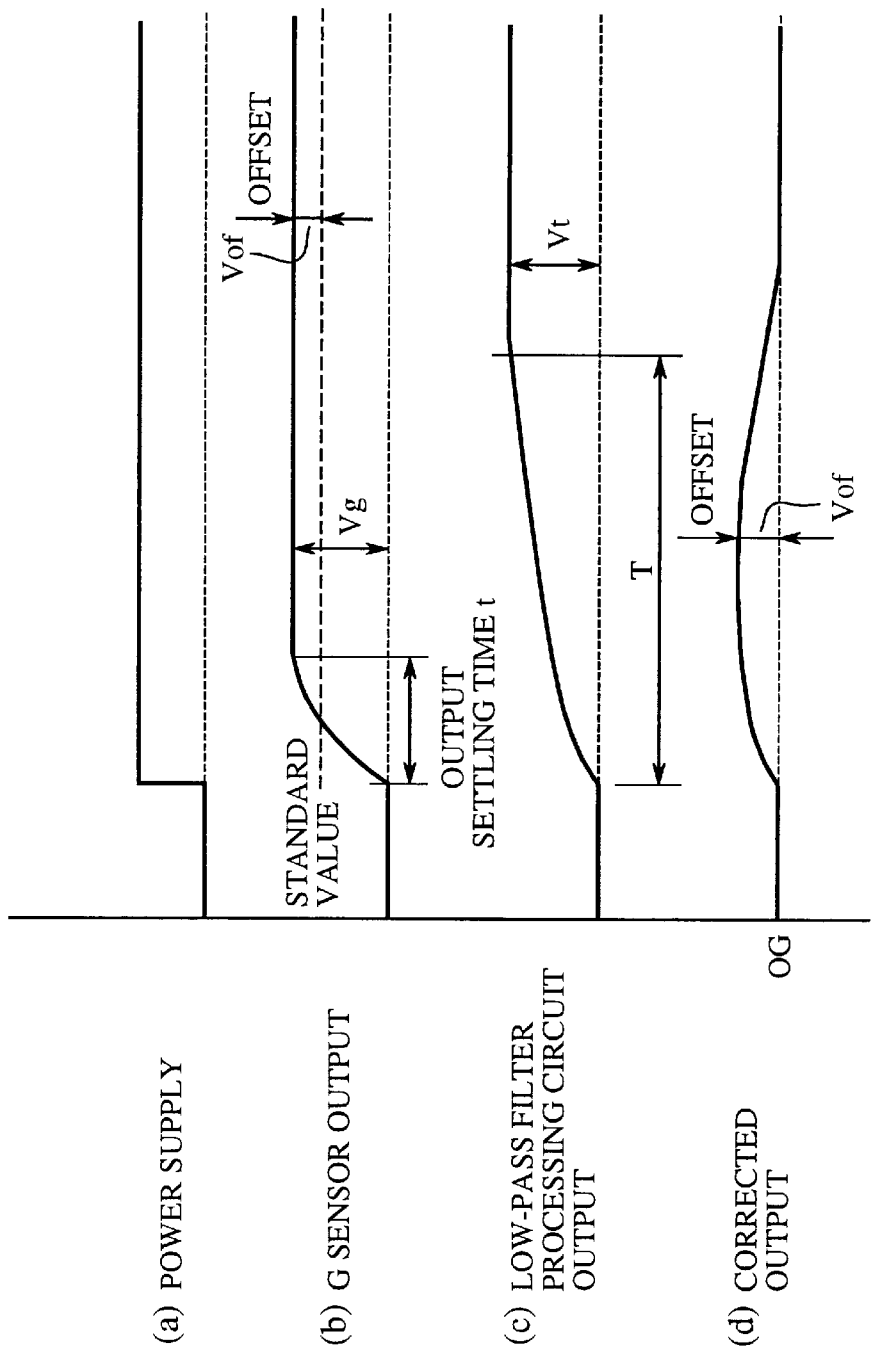
FIG. 3 is a timing chart showing the principle of a corrective processing operation of an output of the acceleration sensor of the first embodiment.

FIG. 3 is a timing chart showing the principle of a corrective processing operation of an output of the acceleration sensor in the air bag unit A.

(a) Upon power is supplied to the acceleration sensor 1, (b) the acceleration sensor 1 is turned on, the output of which settles to a reference voltage Vg after a predetermined output settling time t has elapsed. At this time, suppose dispersion of the output of the acceleration sensor 1 is absent and power supply (e.g. 5V) is the standard value, the reference voltage Vg becomes equal to the standard value (e.g. 2.5 V). On the other hand, in the presence of dispersion of the parts and supply voltage of the acceleration sensor 1 the output Vg of the acceleration sensor deviates greatly or slightly from the standard value and results in generation of an offset Vof. Sometimes, dispersion of the parts of the acceleration sensor would occur in use due to a temperature change, which could generate a drift whose offset gradually changes.

Once the offset Vof is generated, the air bag unit A treats it as if an acceleration has apparently generated, even through an acceleration is not actually generated. This leads a collision judging operation in the CPU 3 to malfunction or non-function. To improve such inconveniences and close to a value of the real acceleration, a correction for an output is made by the low-pass filter processing circuit 11. In the other words, (c) the output of the low-pass filter processing circuit 11 gently rises until it comes to a time T that is determined by a given time constant after the acceleration sensor 1 is turned on and subsequently settles at voltage Vt. In short, this is equivalent to obtaining the mean value. Subtraction (Vg–Vt) of the output Vt of the low-pass filter from the output vg of the acceleration sensor gives (d) the corrected output. As shown in FIG. 3, the corrected output generates an offset Vof at the initial rise stage of the low-pass filter, but it ultimately converges to a zero point (0G).

The corrective operation of an output of the acceleration sensor will specifically be described.

First Embodiment

Figure 4:
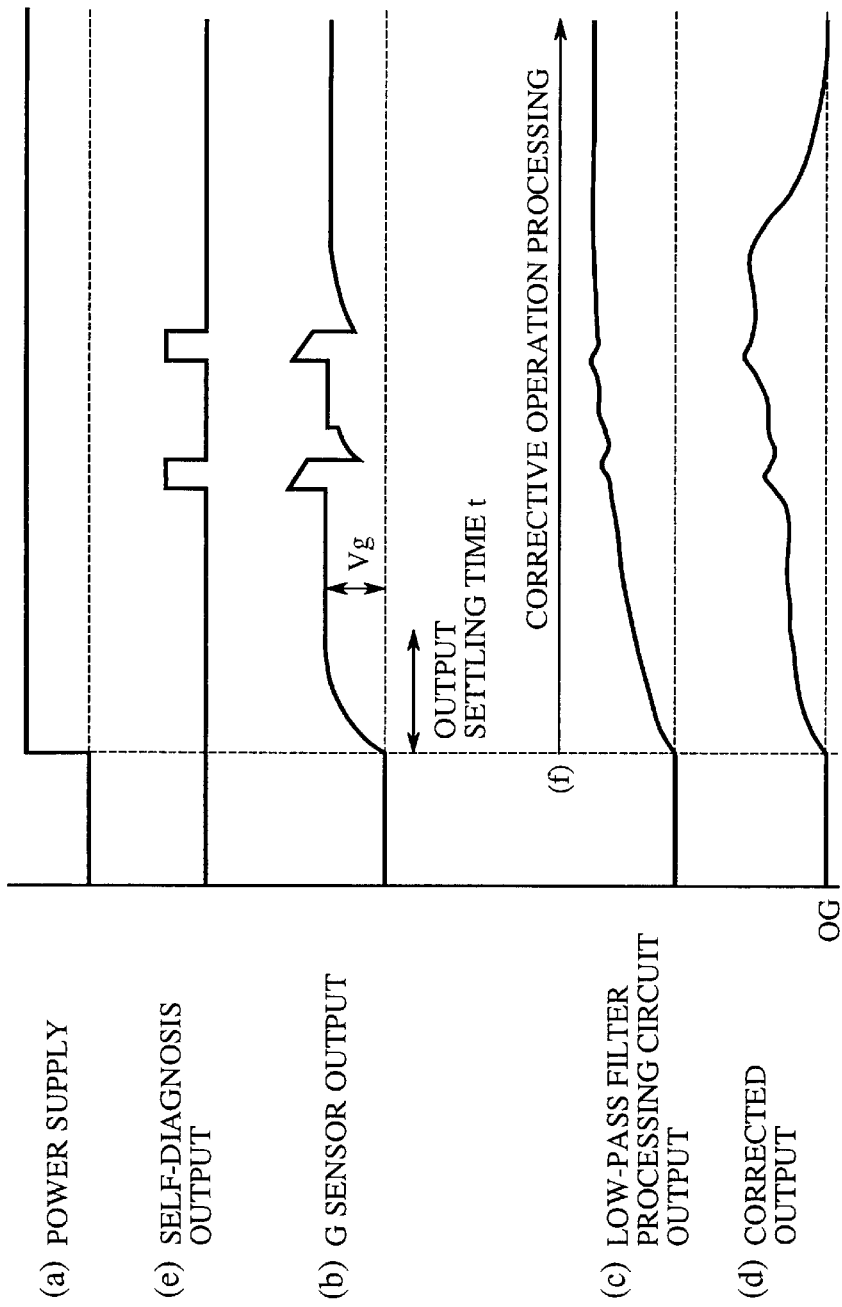
FIG. 4 is a timing chart showing a corrective operation of an output of the acceleration sensor of the first embodiment.

FIG. 4 is a timing chart showing a corrective operation of the corrective device of an output of the acceleration sensor according to the first embodiment.

(e) When a rectangular waveform self-diagnosis output is inputted to the acceleration sensor 1 for a self-diagnosis check of the acceleration sensor 1, (b) differentiated waves of the reference voltage Vg are outputted from the acceleration sensor 1. As a result, (c) variations of the output of the acceleration sensor at the time of self-diagnosis check appear at the output of the low-pass filter processing circuit 11. So doing like that, (c) variations of the output of the acceleration sensor at the time of the self-diagnosis check appear at the output of the low-pass filter processing circuit 11, and similar variations appear at the corrected output after having been executed (f) a corrective operation processing by the operation unit 12 in the CPU 3. Finally, (d) they converge to a zero point (0G).

In the first embodiment, to avoid prolongation of a convergence time to a zero point resulted from variations appeared at (d) the corrected output and a lowering of accuracy of the zero point occurred as a necessary consequence, the corrective operation processing is executed before starting the self-diagnosis check (prior to inputting a rectangular waveform output of the self-diagnosis to the acceleration sensor 1) or, preferably at the same time of power on by the CPU 3. This prevents variations of the corrected output due to the self-diagnosis check, thereby allowing correction with high accuracy.

Second Embodiment

Figure 5:
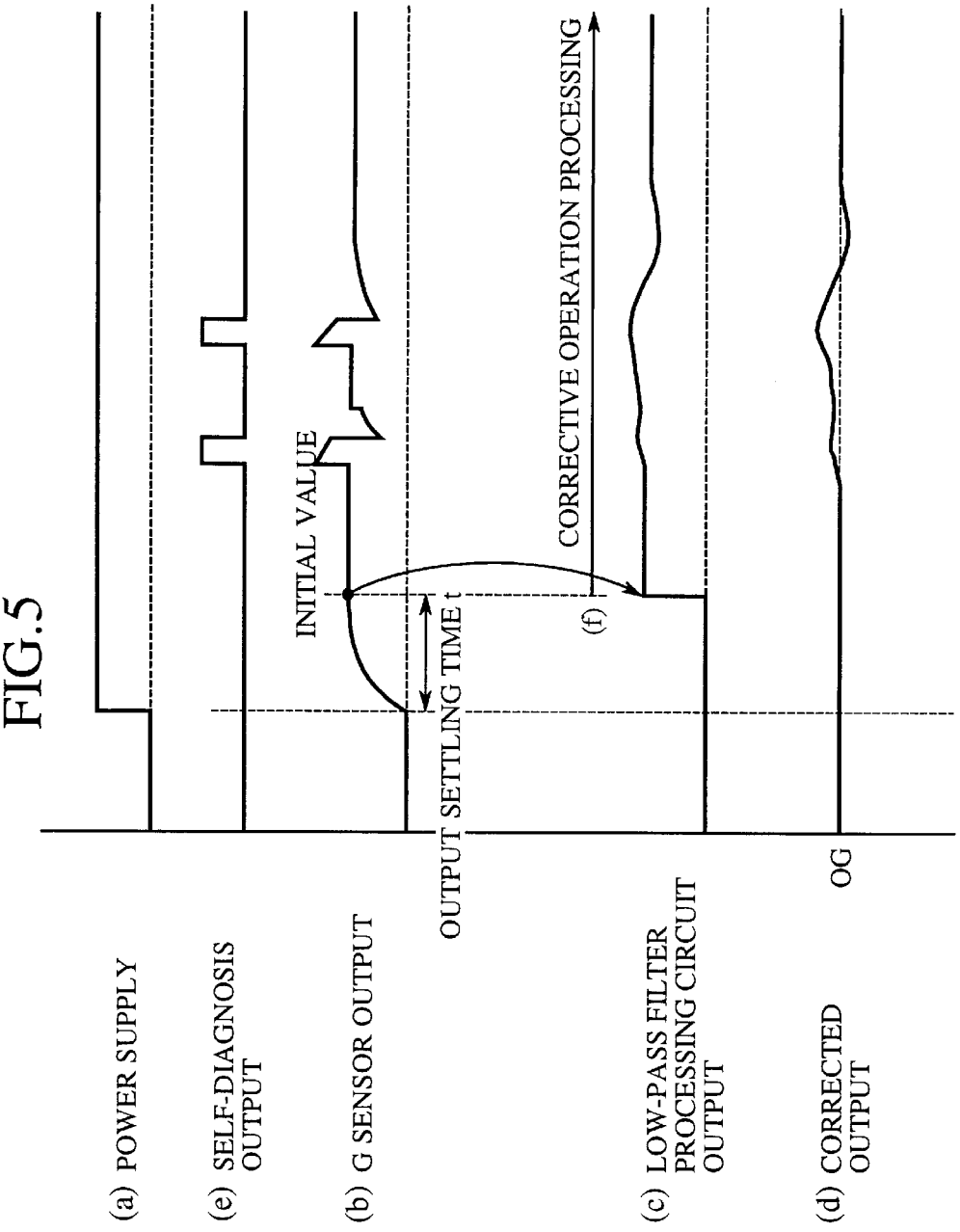
FIG. 5 is a timing chart showing a corrective operation of an output of the acceleration sensor of the second embodiment.

FIG. 5 is a timing chart showing a corrective operation of the corrective device of an output of the acceleration sensor according to the second embodiment.

In the second embodiment, a specific example where a corrective operation processing is executed by the CPU 3 before starting a self-diagnosis check is shown.

An initial value of (f) the corrective operation processing (b) is taken in from the acceleration sensor before starting a self-diagnosis check and (d) the corrected output is previously converged to a zero point at earlier time. Namely, after an output settling time t has elapsed, the output of the acceleration sensor 1 is taken as an initial value in the low-pass filter processing circuit 11 to produce (c) its output. This enables reduction in variations of the corrected output as minimum as possible, even if the self-diagnosis check has already started. Further, taking an initial value in the low-pass filter processing circuit 11 accelerates convergence to the reference value thereof.

Third Embodiment

Figure 6:
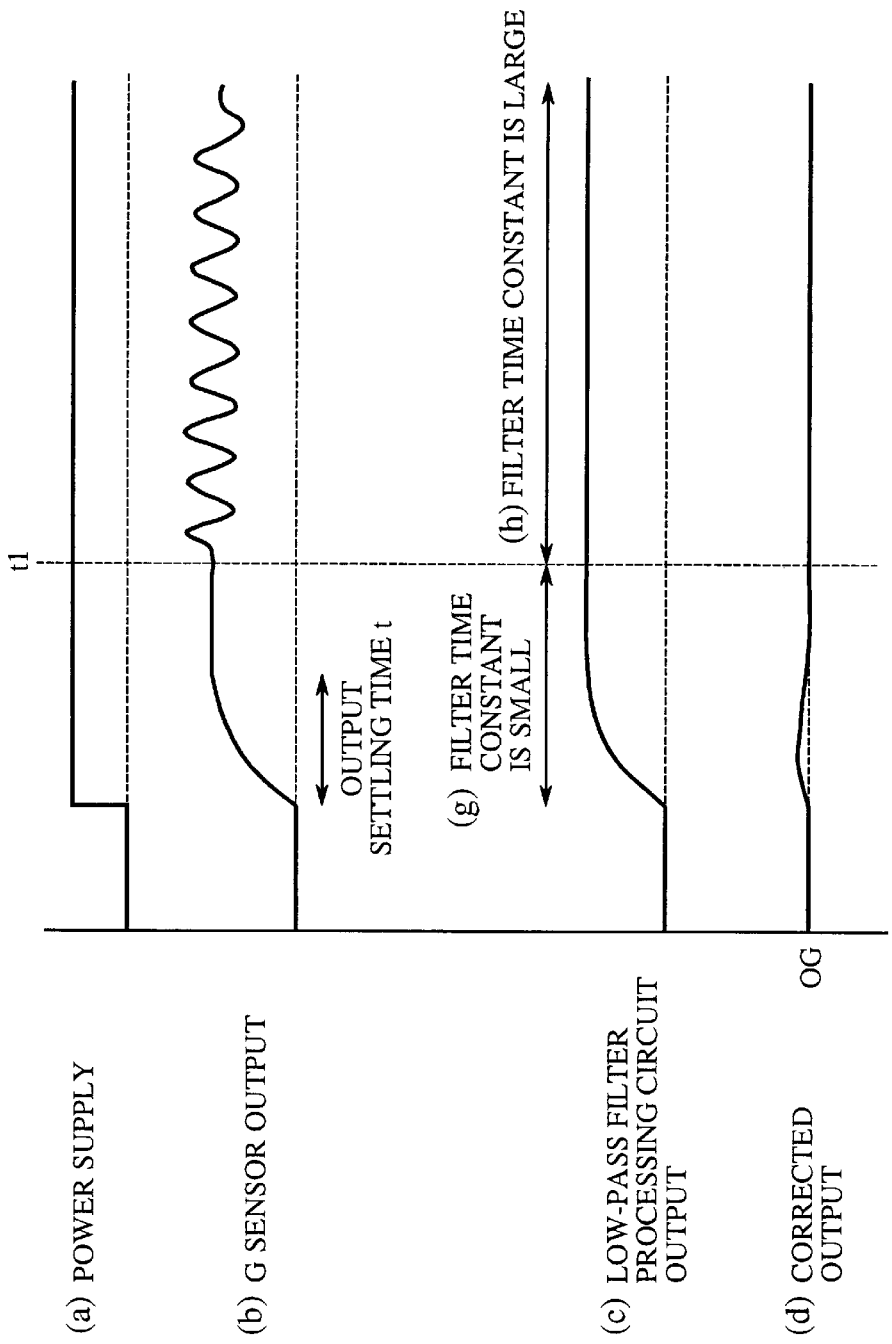
FIG. 6 is a timing chart showing a corrective operation of an output of the acceleration sensor of the third embodiment.

FIG. 6 is a timing chart showing a corrective operation of the corrective device of an output of the acceleration sensor according to the third embodiment.

In the third embodiment, (g) setting a time constant of the low-pass filter processing circuit 11 to a small value after power on (d) accelerates convergence of the corrected output to a zero point. (h) The time constant of the low-pass filter processing circuit 11 is set to a large value at a certain point t1 so as to reduce corrective sensitivity, which suppresses steadily occurring variations of (b) the output of the acceleration sensor and enhances accuracy of the correction.

Figure 7:
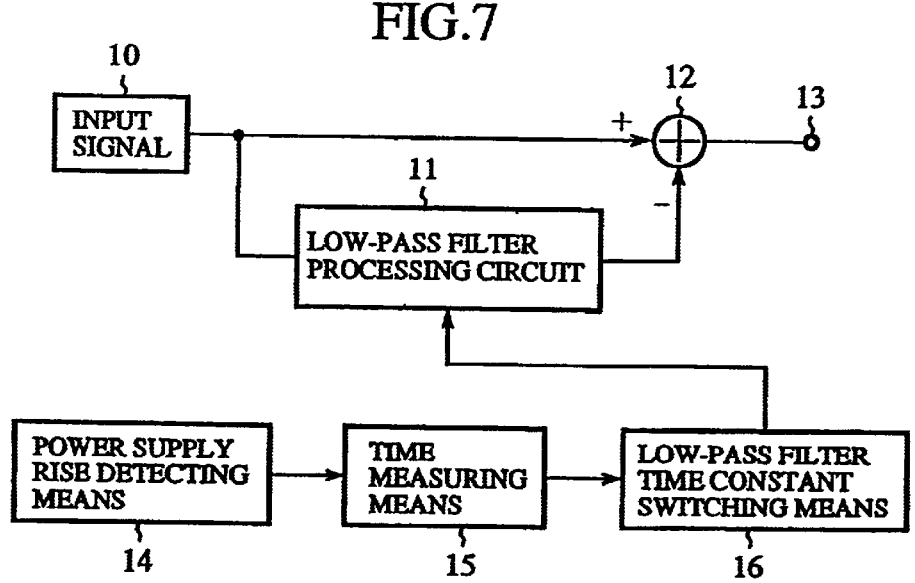
FIG. 7 is a block diagram showing an example of a time constant switching circuit of a low-pass filter.
Figure 9:
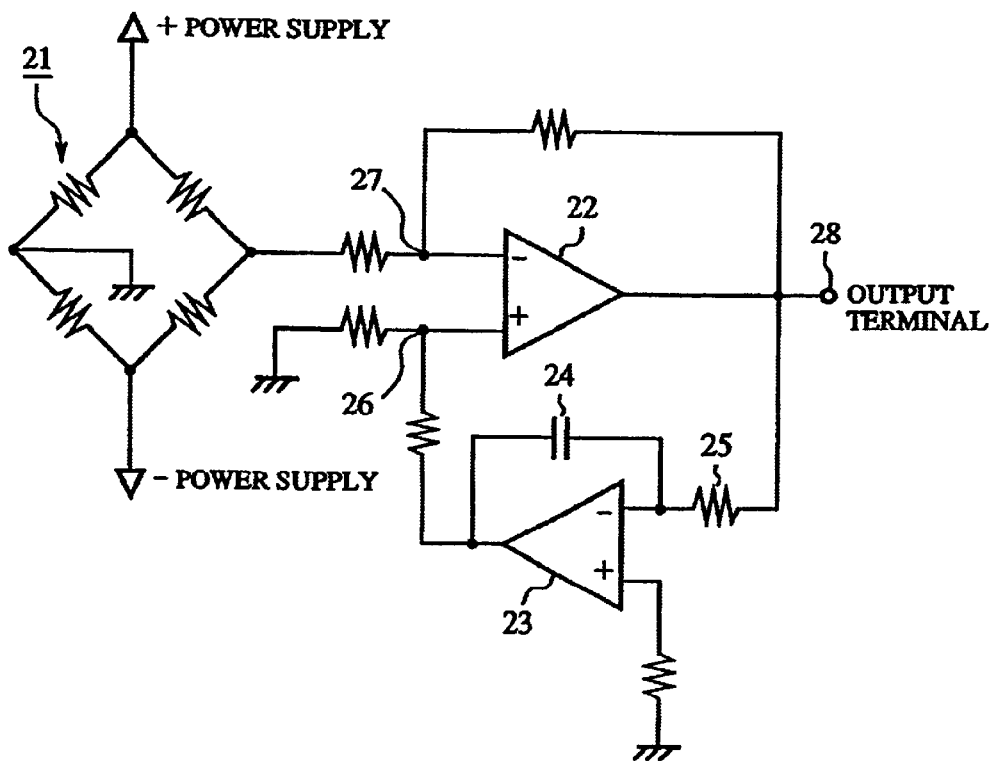
FIG. 9 is a block diagram showing a conventional corrective device for an output of the acceleration sensor.

FIG. 7 is a specific example of the time constant switching circuit of the low-pass filter processing circuit 11.

Referring to FIG. 7, reference numeral 14 denotes power supply rise detecting means, 15 denotes time measuring means, 16 denotes low-pass filer time constant switching means. As shown in FIG. 7, the time constant of the low-pass filter processing circuit 11 is arbitrarily switched after a predetermined time has elapsed starting from power on.

Fourth Embodiment

The fourth embodiment is, unlike the above third embodiment, intended setting a point of time t1 at which the time constant of the low-pass filter processing circuit 11 is switched to a period immediately before (immediately before generation of rectangular waves) starting a self-diagnosis check.

Figure 8:
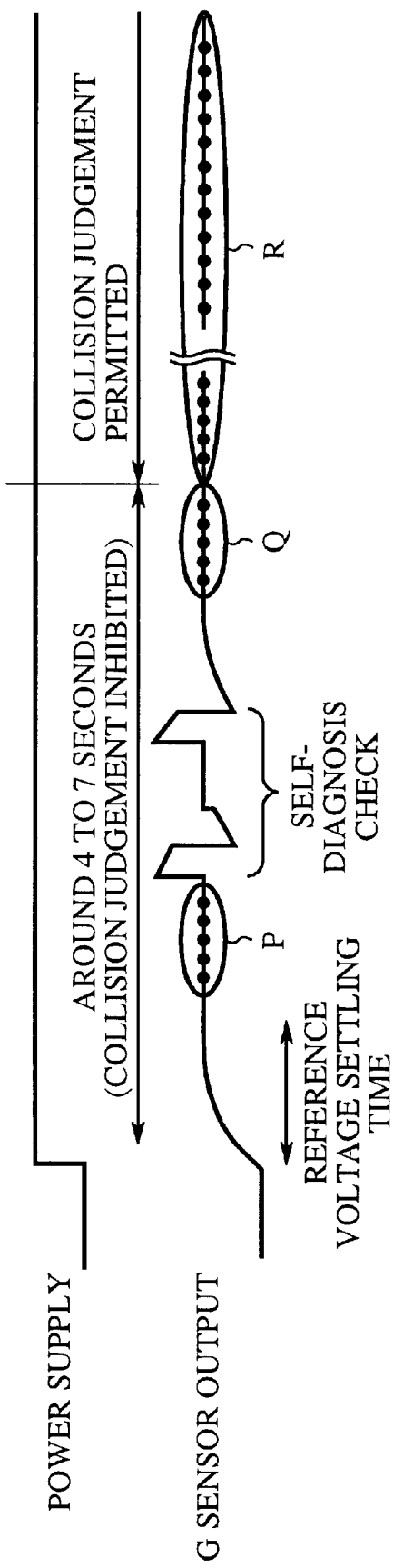
FIG. 8 is an explanatory drawing showing the relation between power on and an output of the acceleration sensor

FIG. 8 is an explanation drawing showing the relation between power on and an output of the acceleration sensor.

In the fourth embodiment, the time constant is switched at a time P immediately before starting the self-diagnosis check. In this manner, the time constant of the low-pass filter processing circuit 11 is set to a small value before starting the self-diagnosis check so as to previously accelerate convergence to the reference value. Whereas, the time constant of the low-pass filter processing circuit 11 is set to a large value immediately before starting the self-diagnosis check in order to suppress output variations of the corrected output due to the self-diagnosis check.

Fifth Embodiment

The fifth embodiment is, unlike the above third embodiment, intended setting a point of time t1 at which the time constant of the low-pass filter processing circuit 11 is switched to a period immediately after (immediately after generation of rectangular waves, time Q in FIG. 8) completing the self-diagnosis check. This sets the time constant of the low-pass filter processing circuit 11 to a small value before or during the self-diagnosis check so as to previously accelerate convergence to the reference value, and suppresses variations of the corrected output due to output variations of the self-diagnosis check. After completing the self-diagnosis check, variations due to unnecessary impacts and noises etc. can be suppressed.

Sixth Embodiment

The sixth embodiment is, unlike the third embodiment, intended setting a point of time t1 at which the time constant of the low-pass filter processing circuit 11 is switched is set to a period after completing the self-diagnosis check (time R in FIG. 8) where a collision judgement is permitted. As shown in FIG. 8, a self-diagnosis check is executed for around 4 to 8 seconds after power on and, after that a collision judgement is permitted. In this way, the time constant is switched during the permitted collision judging time. Hence, the time constant of the low-pass filter processing circuit 11 is set to a small value before or during the self-diagnosis check in order to previously accelerate convergence to the reference value, thereby allowing suppression of variations of the corrected output due to output variations of the self-diagnosis check. After completing the self-diagnosis variations due to unnecessary impacts and noises etc. can be suppressed.

Generally, in a system, such as an air bag controller, that generates no acceleration immediately after power on, e.g., a system where a vehicle scarcely moves and hardly generates an acceleration, a collision judgement operation for deployment of an air bag is inhibited for around 4 to 7 seconds at the initial stage immediately after power on. After the initial stage, the collision judging operation is permitted. Accordingly, when the collision judging operation has started, offset variations of the sensor output should be eliminated. For a judging operation using more accurate data the time constant of the low-pass filter processing circuit 11 in a corrective operation processing is set to a small value at the initial stage so as to previously accelerate convergence to the reference value. This allows a collision judgement using data without containing offset in a normal operation after the initial stage.

Conversely, when the time constant of the low-pass filter processing circuit 11 is, in the normal operation, set to a large value, responsibility of the corrected output will become worse. Thus, through the acceleration, not impact, generated by impingement such as road noises etc, which are generated in the course of driving, accuracy of the correction is enhanced without variations of the corrected output.

In order not to take in an influence exerted by output variations due to the self-diagnosis check of the acceleration sensor 1, it is desirable to suspend the corrective operation processing during the self-diagnosis for enhancement of accuracy of the correction.

While, in the above prior arts and preferred embodiments of the invention, digitalization of the phase difference detecting circuit is given as an example for brevity, it should be understood by those skilled in the art that various modifications and changes may be made without departing from the sprit and scope of the invention.

Also, it should be noted that the invention meets all the objects mentioned above and also has the advantages of wide commercial utility, and that the invention has been set forth for purposes of illustration only and not of limitation. That is, the invention is limited only by the following claims which follow. Consequently, reference should be made to the following claims in determining the full scope of the invention.

What is claimed is:

1. A corrective device for correcting an output of an acceleration sensor, said corrective device comprising a control means for processing an output of said acceleration sensor to make a collision judgement and for executing an activation processing of an air bag, wherein said control means comprises operation processing means for inputting s self-diagnosis check signal to said acceleration sensor and for executing an offset corrective operation processing of the output of said acceleration sensor prior to inputting said self-diagnosis check signal to said acceleration sensor.

2. The corrective device for an output of the acceleration sensor according to claim 1, wherein said control means takes in an initial value of the offset corrective operation processing from the output of said acceleration sensor prior to inputting said self-diagnosis check signal to said acceleration sensor.

3. The corrective device for an output of the acceleration sensor according to claim 1, wherein a time constant of an offset corrective operation circuit in said control means is set to a small value immediately after power on and to a large value in operation.

4. The corrective device for an output of the acceleration sensor according to claim 3, wherein said control means sets switching timing of said time constant of said offset corrective operation processing circuit before starting said self-diagnosis check.

5. The corrective device for an output of the acceleration sensor according to claim 3, wherein said control means sets switching timing of said time constant of said offset corrective operation processing circuit after completing said self-diagnosis check.

6. The corrective device for an output of the acceleration sensor according to claim 3, wherein said control means sets switching timing of said time constant of said offset corrective operation processing circuit immediately before giving permission to an activation judgement of said air bag unit.

7. The corrective device for an output of the acceleration sensor according to claim 1, wherein said control means suspends said offset corrective operation processing during said self-diagnosis check.

8. A method of correcting an output of an acceleration sensor in which a collision judgement and an activation judgement of an air bag are made by control means that takes in an output of said acceleration sensor, wherein said operation processing means in said control means inputs a self-diagnosis check signal to said acceleration sensor, and executes an offset corrective operation processing of the output of said acceleration sensor prior to inputting said self-diagnosis check signal to said acceleration sensor.

* * * * *

UNITED STATES PATENT AND TRADEMARK OFFICE
CERTIFICATE OF CORRECTION

PATENT NO. : 6,681,162 B2
DATED : January 20, 2004
INVENTOR(S) : Yukihiro Okimoto It is certified that error appears in the above-identified patent and that said Letters Patent is hereby corrected as shown below:

Column 7,
Line 8, please delete "said" and insert -- an --.

Signed and Sealed this

Twenty-fifth Day of January, 2005

JON W. DUDAS
*Director of the United States Patent and Trademark Office*